United States Patent [19]

Carson

[11] Patent Number: 4,787,259

[45] Date of Patent: Nov. 29, 1988

[54] ROTARY DRIVE APPARATUS HAVING MULTIPLE DRIVE SHAFTS

[76] Inventor: Donald G. Carson, 12108 Towner Ave., NE., Albuquerque, N. Mex. 87112

[21] Appl. No.: 11,683

[22] Filed: Feb. 6, 1987

[51] Int. Cl.[4] .................. F16H 27/02; F16H 29/02
[52] U.S. Cl. ............................. 74/89.2; 74/10.7; 74/665 B
[58] Field of Search ............... 74/89.2, 89.21, 89.22, 74/10.7, 501.5, 496, 506, 517, 665 B, 665 GE; 474/84

[56] References Cited

U.S. PATENT DOCUMENTS 3,477,536 11/1969 Carini ........................... 74/665 B
4,351,197 9/1982 Carson ......................... 74/89.22

Primary Examiner—Lawrence Staab
Attorney, Agent, or Firm—H. Gordon Shields

[57] ABSTRACT

Rotary drive apparatus includes a plurality of driving elements connected by a cable to a single driven element, with the multiple drive elements spaced apart about the periphery of the driven elements for imparting rotary motion to the driven element in response to rotation of the driving elements.

5 Claims, 1 Drawing Sheet

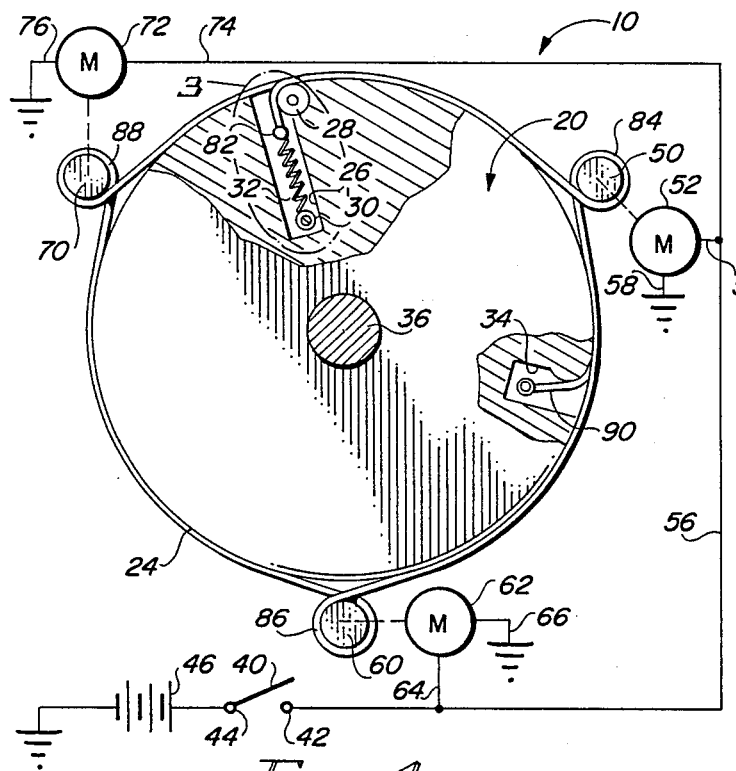
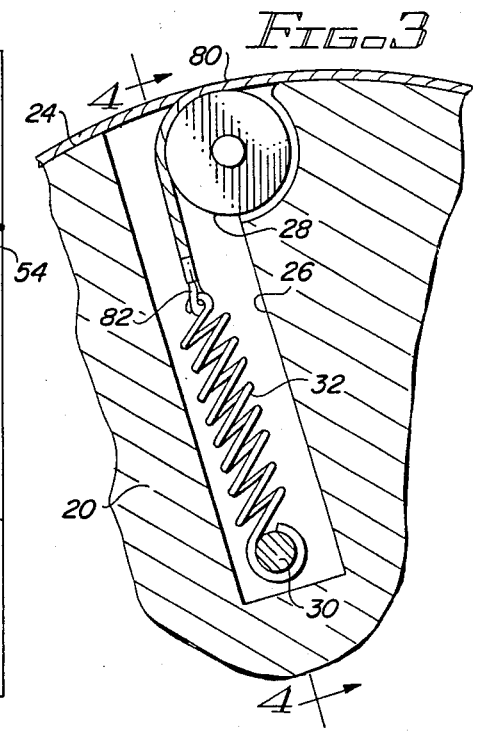
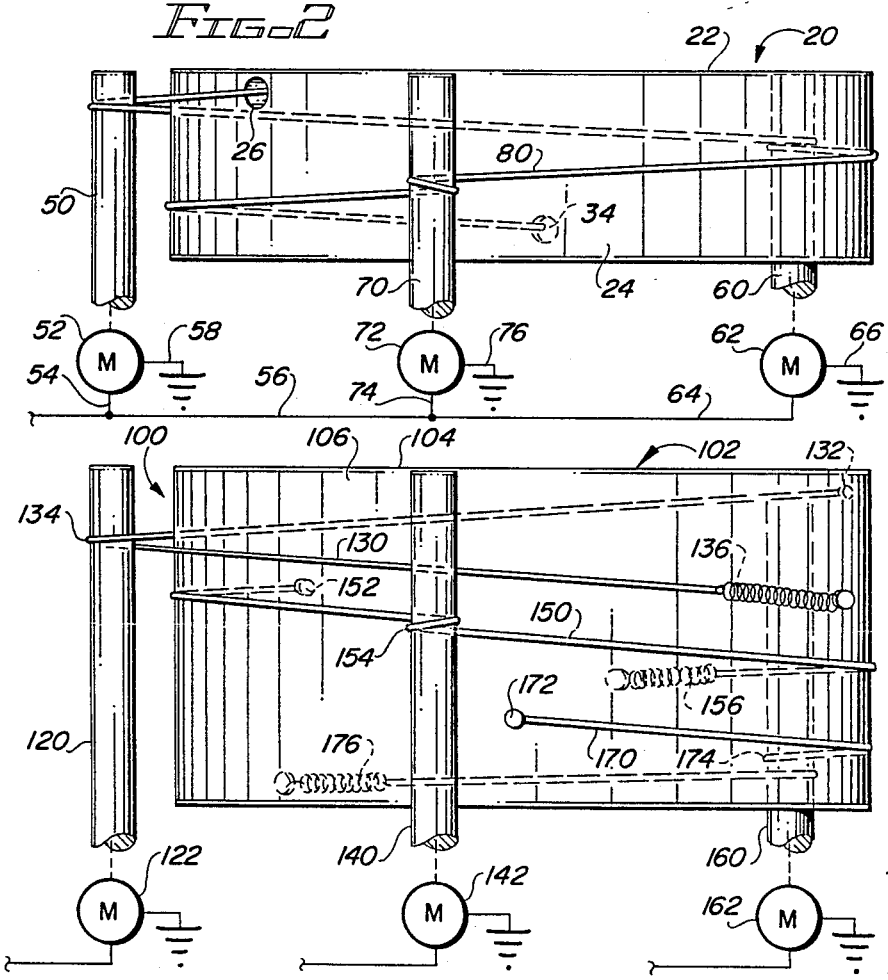
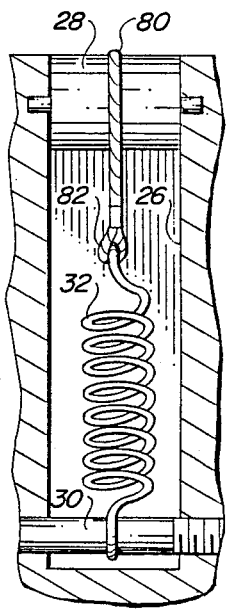

ROTARY DRIVE APPARATUS HAVING MULTIPLE DRIVE SHAFTS

BACKGROUND OF THE INVENTION

Field of the Invention

This invention relates to rotary drive apparatus and, more particularly, to rotary drive apparatus in which a single driven element is connected by a cable to a plurality of driving elements, each of which is connected to a motor for imparting rotary motion to the driven element to rotation of the driven elements.

Description of the Prior Art

U.S. Pat. No. 4,351,197 (Carson) discloses several embodiments of rotary drive apparatus in which a threaded screw is connected by cable to a single driven element, namely a drum. A motor causes the driving element to rotate, and the cable connection between the driving element and the driven element imparts rotary movement to the driven element or drum. A single drive shaft is used as the driving element.

A primary advantage of utilizing more than one drive shaft is redundancy for applications requiring high rotatability and low probability of failure. If several drive shafts are used, and one should fail, the remaining shafts will continue to operate.

For applications requiring extremely high torques, the drive apparatus may require more torque than can be obtained with a single drive element. For example, using a single electric motor limits the torque to the output of the single motor. If either the motor size or torque is a limitation, several motors may simultaneously drive a single drum by the apparatus of the present invention.

In applications where extreme rotational drive smoothness is critical, the use of multiple drive motors may be advantageous because the motors may be rotationally positioned relative to one another so that the magnetic cogging imparted by the motors is minimized.

The use of multiple shafts may have other advantages also. For example, one or more of the drive shafts may be utilized as a driven shaft which may be used to drive a shaft angle encoder, tachometer, or other device.

A further advantage of using multiple shafts is in increasing the rotary stiffness of the system. Stiffness varies with the spacing between rotary members, the number of cables used, and the number of shafts. By increasing the number of shafts, the greater the stiffness of the system.

SUMMARY OF THE INVENTION

The invention described and claimed herein comprises a single drive element connected by cable to a plurality of driving elements, and the driving elements are spaced apart about the periphery of the driven element. A cable extends about the driving elements, which may be threaded screws, and about the driven element to impart a precisely controlled rotation of the driven element in response to the rotation of the driving elements.

Among the objects of the present invention are the following:

To provide new and useful rotary drive apparatus having a plurality of driving elements;

To provide new and useful rotary drive apparatus in which a cable is disposed about a driven element and connected to a plurality of driving elements; and To provide new and useful rotary drive apparatus having a plurality of driving elements disposed about the periphery of a driven element.

BRIEF DESCRIPTION OF THE DRAWING

FIG. 1 is a top schematic view, partially broken away, of apparatus of the present invention.

FIG. 2 is a side schematic representation of the apparatus of FIG. 1.

FIG. 3 is an enlarged view in partial section of a portion of the apparatus taken generally from circle 3 of FIG. 1.

FIG. 4 is a view in partial section taken generally along line 4—4 of FIG. 3.

FIG. 5 is a side schematic representation of an alternate embodiment of the apparatus of FIGS. 1-3.

DESCRIPTION OF THE PREFERRED EMBODIMENT

FIG. 1 is a top view of rotary drive apparatus 10 of the present invention. The rotary drive apparatus 10 includes a driven element or drum 20 which is appropriately journaled for rotation on a center shaft 36. The driven element 20 is driven by three drive shafts, including a drive shaft 50, a drive shaft 60, and a drive shaft 70. The drive shafts 50, 60, and 70 are coupled to the drum 20 by a cable 80. An electrical system, including three drive motors, is schematically illustrated in FIG. 1 and in FIG. 2. FIG. 2 is a side view of the rotary drive apparatus 10.

The driven member or element 20 includes two inwardly extending bores 26 and 28. The cable 80 includes an end 82 and an end 90. The end 82 extends into the bore 26. The end 90 extends into a bore 34 and is terminated therein. FIG. 3 is an enlarged view in partial section of the bore 26 illustrating the termination of the end 82 of the cable 80 within the bore 26. FIG. 4 is a view of the bore 26 taken generally along line 4—4 of FIG. 3.

For the following discussion of the rotary drive apparatus 10, reference will be made to FIGS. 1, 2, 3, and 4.

The drum 20 includes a top surface 22 which may have disposed on and secured thereto a desired element or apparatus which is to be positioned or moved in conjunction with the driven drum 20. The drum 20 also includes a generally circular outer periphery 24. The cable 80 is disposed in a helical fashion about the periphery 24. The bores 26 and 34 extend inwardly from the periphery 24.

The end 82 of the cable 80 is disposed within the bore 26, as best shown in FIGS. 3 and 4. The end 82 is connected to one end of a tension spring 32 in the bore 26. The opposite end of the tension spring 32 is appropriately secured to a pin 30. From the tension spring 32, the cable 80 extends over the surface of a smooth roller 28 to the peripheral surface 24 of the drum 20. The cable 80 extends helically about or on the periphery 24 of the drum 20 to the drive shaft 50. The cable then extends helically about the drive shaft 50 in a single coil or helix 54 and back on to the periphery 24 of the drum 20. From the drive screw 50, the cable 80 continues helically to the second drive screw 30. The cable 80 then makes a single helical turn or coil 86 about the drive screw 60 and returns to the peripheral surface 24 of the drum 20. The coil then extends, still helically, on the peripheral surface 24 to the third drive shaft or drive screw 70. The cable makes a single turn or coil 88 about the drive shaft or drive screw 70 and returns again to the peripheral surface 24 of the drum 20. The cable 80 then continues about the drum 20 to the bore 34 where the end 90 is fixedly or "hard" terminated in the bore 34.

The drive shaft 50 is connected to a reversible electric motor 52. The motor 52 is connected by a conductor 54 to a conductor 56. The motor 52 is connected to an appropriate ground by conductor 58.

The drive shaft 60 is appropriately connected by a second motor 62. The motor 62 is also a reversible motor, substantially identical to the motor 52. A conductor 64 extends from the motor 62 to the conductor 56. The motor 62 is connected to an appropriate ground by conductor 66.

The drive shaft 70 is connected to an appropriate electric motor 72. The motor 72 is substantially identical to the motors 52 and 62. The motor 62 is connected to the conductor 56 by a conductor 74. The motor 72 is appropriately grounded through a conductor 76.

As shown in FIG. 1, the conductor 56 extends to a terminal 42. A switch 40, connected to a second terminal 44, opens and closes the electrical circuitry for the motors 52, 62, and 72. The switch 40, and its terminal 44, are in turn connected to an appropriate electrical current source 46. The ground terminals of the motors are appropriately connected, as is well known and understood, to the ground or return side of the electrical current source 46.

It will be noted that the motors 52, 62, and 72 are in parallel with each other, and are appropriately controlled by the switch 40. Accordingly, when the switch 40 is closed, all three motors 52, 62, and 72 will operate substantially simultaneously.

As indicated above, the three motors 52, 62, and 72 are preferably reversible motors, which require the appropriate switching of the direction of the electrical current. The schematic representation of FIG. 1 will be understood to be a schematic representation only. Obviously, such directional control of motors is well known and understood in the art.

By utilizing three drive shafts 50, 60, and 70, all coupled together by cable to a single driven drum 20, the torque applied to the drive shafts is equally spread about the periphery of the drum 20. This means, essentially, that three relatively small motors may be used instead of a single motor, and that multiple drive shafts may be used to spread the torque equally about the periphery of the driven element. The driving elements illustrated in FIGS. 1 and 2 comprise three driving elements or shafts, but it is obvious that more than three may be used, if desired. Moreover, two driving shafts may also be used, in which case they would preferably be disposed one-hundred-eighty degrees apart. As shown, the three drive shafts or drive screws are located one-hundred-twenty degrees apart, or equally spaced apart, about the periphery 24 of the drum 20. Moreover, it will be understood that one of the motors, if desired, may be a rotary sensor or may have a rotary sensor in conjunction with a drive shaft, if desired. The sensor senses the speed and location of the shaft to which it is connected, as is well known and understood in the art.

A single cable 80 is shown connecting the driven element or member 20 to all three of the driving members or elements 50, 60, and 70. If desired, each driving element may be coupled to the driven element by a separate cable. Such an arrangement is illustrated in FIG. 5. FIG. 5 comprises a side schematic representation of an alternate embodiment 100. The rotary drive embodiment 100 comprises a single rotatable, driven member 102 coupled to three drive shafts.

In FIG. 5, the multiple shaft rotary drive apparatus 100 includes a drum 102. The drum 102 is the driven element, and three drive shafts, including a drive shaft 120, a drive shaft 140, and a drive shaft 160 are coupled to the drum 102 by three separate cables. The drive shaft 120 is coupled to the drum 102 by a cable 130. The drive shaft 140 is coupled to the drum 102 by a cable 150. The drive shaft 160 is coupled to the drum 102 by a cable 170.

The drive shaft 120 is driven by an electric motor 122. The drive shaft 140 is driven by an electric motor 142, and the drive shaft 160 is driven by a motor 162. The motors 122, 142, and 162 are, of course, reversible electric motors. They are preferably appropriately connected in parallel, in an arrangement similar to that shown in FIGS. 1 and 2 for the multiple shaft rotary drive apparatus 10.

The drum 102 includes a top 104 which maybe appropriately connected to an element desired to be positioned by the rotary drive apparatus 100. The drum 102 includes an outer peripheral surface 106 which is appropriately cylindrical in configuration. The cables 130, 150, and 170 extend helically about the periphery 106. The cables also extend helically about their respective drive shafts 102, 140, and 160.

The cable 130, the uppermost cable, in "hard" terminated to the drum 102 at its end 132. From the hard termination 132, the cable 130 extends on the periphery 106 to the drive shaft 120, where it extends about the drive shaft or drive screw 102 in a single coil 134. The cable 130 then returns to the periphery 106 and extends helically about the periphery through a tension spring 136 which is appropriately connected to the drum 102. The end of the cable 130 is accordingly appropriately connected to the drum 104 through the spring 136.

The cable 150 is the middle cable. It is hard terminated through the drum 102 at its upper end 152. The cable 150 extends from its end 152 helically about the periphery 106 to the drive shaft 140, and takes a single helical turn 154 about the drive shaft 140. The cable 150 then returns to the periphery 106 of the drum 102 and continues about the periphery until it is terminated to the drum 102 through a tension spring 156.

The cable 170, the lowermost of the three cables, includes an upper end 172 which is hard terminated to the drum 102. The cable 170 then extends helically on the periphery 106 to its drive shaft 160, where it includes a single turn or coil 154 about the drive shaft or drive screw 160. The cable 170 then returns to the periphery 106 and extends on the periphery 106 until it is terminated to the drum 102 through a tension spring 176.

It will be noted that all three of the cables are disposed at substantially the same pitch angle on the periphery 106 of the drum as well as on the respective drive screws. As the drum rotates in response to the rotation of the three drive shafts or drive screw, the cables will maintain their respective orientations with respect to the drum by virtue of the helical windings.

The drive shafts of both the rotary drive apparatus 10 and the rotary drive apparatus 102 are shown as being smooth. Similarly, the peripheries 24 and 106 of the driven elements 20 and 102 are shown as being smooth. It is obvious that the peripheries of the driving elements and the driven elements may be appropriately helically configured, if desired. This is particularly true with respect to the drive shafts 50, 60, and 70, and 120, 140, 160. The helical orientation of the cables 80 and 130, 150, 170 on their respective drums 20 and 102 will conform in pitch angle to the pitch angle of the helical threads on the respective drive shafts or drive screws.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Multiple shaft rotary drive apparatus, comprising, in combination:

a relatively large diameter driven element having an outer periphery;

a plurality of relatively small diameter driving elements spaced apart from each other adjacent to the outer periphery of the driven element;

a plurality of motors connected to the plurality of driving elements for rotating the driving elements; and cable means helically disposed about the outer periphery of the driven element and extending helically about the plurality of driving elements for coupling together and rotating the driven element in response to the rotation of the driving elements.

2. The apparatus of claim 1 in which the cable means includes a cable secured to the driven element and extending on the outer periphery of the driven element and about each driving element.

3. The apparatus of claim 1 in which the cable means includes a plurality of cables secured to the driven element, with the number of cables in the plurality of cables corresponding to the number of driving elements in the plurality of driving elements.

4. The apparatus of claim 3 in which each cable of the plurality of cables extends about a corresponding one of the driving elements for coupling each driving element separately to the driven element.

5. The apparatus of claim 4 in which each cable has a first end and a second end, and the first ends are hard terminated and the second ends are spring terminated.

* * * * *